United States Patent [19]

Naitou et al.

[11] 4,177,778
[45] Dec. 11, 1979

[54] CARBURETORS WITH HEATING DEVICE

[75] Inventors: Takashi Naitou, Kariya; Masaharu Sumiyoshi; Osamu Ito, both of Toyota; Nobuhito Hobo, Inuyama; Yutaka Suzuki, Nishio, all of Japan

[73] Assignees: Nippondenso Co., Ltd.; Toyota Jidosha Kobyo Kabushiki Kaisha, both of Aichi, Japan

[21] Appl. No.: 817,706

[22] Filed: Jul. 21, 1977

[30] Foreign Application Priority Data

Jul. 29, 1976 [JP] Japan .................................. 51/90602
Nov. 29, 1976 [JP] Japan ................................ 51/143891
May 6, 1977 [JP] Japan .................................. 52/52317

[51] Int. Cl.[2] ........................................... F02M 31/00
[52] U.S. Cl. ............................ 123/122 F; 123/122 D; 123/122 E; 261/142; 219/206; 219/207; 219/381
[58] Field of Search ........... 123/122 F, 122 E, 122 H, 123/122 D; 261/142; 219/206, 207, 307, 374, 375, 376, 381, 382, 505

[56] References Cited

U.S. PATENT DOCUMENTS

| 1,276,169 | 8/1918 | Buchmann | 261/142 |
| 1,461,470 | 7/1923 | Ackley | 261/142 |
| 1,637,104 | 7/1927 | Crone | 123/122 F |
| 1,931,379 | 10/1933 | Graziano | 123/122 F |
| 3,215,417 | 11/1965 | Whitmore | 123/122 F |
| 3,927,300 | 12/1975 | Wada | 219/381 |
| 3,987,772 | 3/1975 | McBride | 123/122 F |

Primary Examiner—Ronald H. Lazarus
Attorney, Agent, or Firm—Oblon, Fisher, Spivak, McClelland & Maier

[57] ABSTRACT

In a carburetor, a heating device comprises a honeycomb heater element disposed within at least one of fuel and air passages of the carburetor to heat the fuel and/or air passing therethrough, the honeycomb heater element being made of a ceramic composition to have a positive temperature coefficient of resistance and being connected at the opposite ends thereof with an electric power source across an ignition switch of the engine, whereby the liquid fuel and/or air is heated by the heating device when the temperature of the liquid fuel or the air is lower than a critical temperature defined by the ceramic composition of the heater element.

9 Claims, 11 Drawing Figures

CARBURETORS WITH HEATING DEVICE

BACKGROUND OF THE INVENTION

The present invention relates to carburetors for internal combustion engines, and more particularly to a carburetor of the type in which a heating device is provided to heat the fuel and/or air up to a predetermined temperature so as to accelerate the ignition of the fuel and air mixture.

Conventional heating devices of this kind are generally classified into a heating device having an electric resistance element and another type of heating device having a heat exchanger leading therein exhaust gases from an internal combustion engine. With the heating device of the former type, thermal energy of the electric resistance element is very influenced by the increase or decrease of the flow quantity of the fuel and/or air to cause unstable changing of the mixing rate of the fuel and air. It is, therefore, required that an electric control device is adapted to the heating device to ensure the thermal energy of the resistance element in accordance with variation of the flow quantity of the fuel and air. On the other hand, with the heating device of the latter type, sufficient thermal energy may not be obtained by the heat exchanger immediately after start of the engine. It is also required that the exhaust gas from the engine is heated to ensure sufficient thermal energy in accordance with the flow quantity of the fuel and air.

SUMMARY OF THE INVENTION

It is, therefore, a primary object of the present invention to provide a heating device for a carburetor in which sufficient thermal energy can always be obtained in accordance with the flow quantity of the fuel and air without any other control device.

Another object of the present invention is to provide a heating device for a carburetor which comprises a honeycomb heater element made of a ceramic composite material to have a positive temperature coefficient of resistance, the honeycomb heater element generating sufficient thermal energy in accordance with the flow quantity of the fuel and air passing therethrough.

A still another object of the present invention is to provide a heating device for a carburetor in which heating of the fuel and/or air is thermostatically controlled at a critical temperature defined by the ceramic composition of the honeycomb heater element.

A further object of the present invention is to provide a heating device for a carburetor in which the honeycomb heater element is designed to be compactly assembled within a fuel or air passage of the carburetor.

In a preferred embodiment of the present invention, there is provided a heating device for a carburetor which comprises a honeycomb heater element disposed within at least one of fuel and air passages of the carburetor to heat the fuel and/or air passing therethrough, the honeycomb heater element being made of a ceramic composition to have a positive tempeature coefficient of resistance and being connected at the opposite ends thereof with an electric power source across an iginition switch of the engine, whereby the liquid fuel and/or air is heated by the heating device when the temperature of the liquid fuel or the air is lower than a critical temperature defined by the ceramic composition of the heater element.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
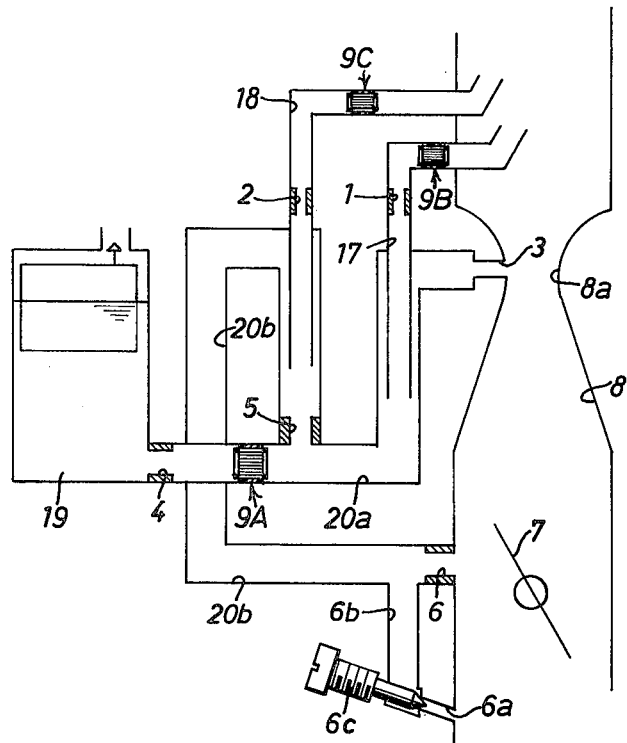
FIG. 1 schematically illustrates a preferred embodiment of the present invention adapted to a conventional carburetor for an automobile.

Referring now to the accompanying drawings, particularly in FIG. 1, there is schematically shown a preferred embodiment in accordance with the present invention adapted to a conventional carburetor for an automobile. The carburetor comprises a barrel or induction passage 8 which communicates at its upstream with an air cleaner (not shown) and at its downstream with an intake manifold of an internal combustion engine for the automobile. The induction passage 8 includes therein a venturi 8a and a throttle valve 7 located at the downstream of the venturi 8a.

A main fuel nozzle 3 is open into the throat of the venturi 8a and is in communication with a main fuel passage 20a extending through a heating device 9A and a main jet 4 to a fuel chamber 19 supplied with liquid fuel from a fuel tank (not shown). The fuel passage 20a is in communication with a main air passage 17 opening into the upstream of the venturi 8a through a main air bleed 1 and a heating device 9B. A slow fuel port 6 is open into the induction passage 8 slightly upstream of the closed position of the throttle valve 7 and is in communication with a slow fuel passage 20b extending through a slow jet 5 to the main fuel passage 20a between the heating device 9A and the downstream end of the main air passage 17. The slow fuel passage 20b is also in communication with a slow air passage 18 opening into the upstream of the venturi 8a through a slow air bleed 2 and a heating device 9C. An idle port 6a is open into the induction passage 8 and is in communication with an idle fuel passage 6b extending to the slow fuel passage 20b. At the juncture between the idle port 6a and the idle fuel passage 6b, an idle metering screw 6c is threadedly provided to regulate flow quantity of fuel discharged through the idle port 6a from the idle fuel passage 6b into the induction passage 8. Thus, the present invention is characterized by provision of the heating devices 9A, 9B and 9C which are fabricated in a same construction.

Figure 2:
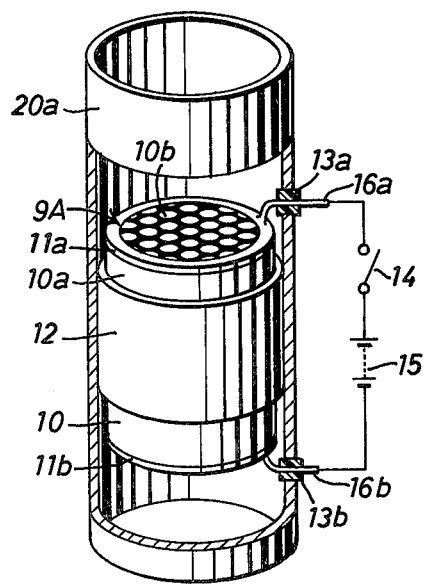
FIG. 2 is an enlarged elevational view in vertical cross-section of a heating device having a honeycomb heater disposed within a main fuel passage of FIG. 1.

In FIG. 2, there is clearly illustrated the heating device 9A which comprises a honeycomb heater 10 disposed coaxially within a portion of the main fuel passage 20a thrugh an annular insulator 12. The honeycomb heater 10 includes a cylindrical portion 10a coupled within the insulator 12 and a honeycomb portion 10b with a number of holes in parallel with the axis of the cylindrical portion 10a. The cylindrical portion 10a of the heater 10 is provided at both ends thereof with aluminium layers which are deposited to provide a pair of ohmic contacts. A pair of annular electrodes 11a and 11b are fixed to the respective aluminium layers and connected to lead wires 16a and 16b extending outwardly through insulators 13a and 13b on the wall of the main fuel passage 20a. Between the lead wires 16a and 16b, an ignition switch 14 for the engine is connected in series with an electric power source 15 in the form of a battery.

Figure 3:
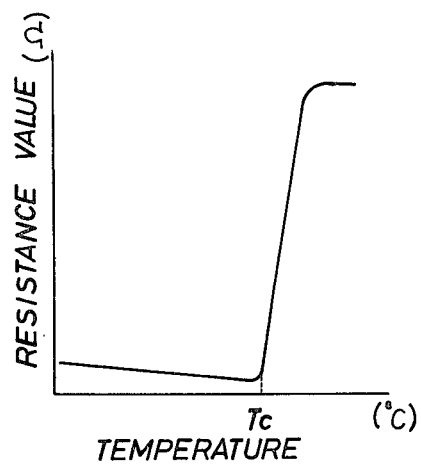
FIG. 3 is a graph showing the relation between resistance value of the honeycomb heater and temperature of liquid fuel flowing through the heater.
Figure 4:
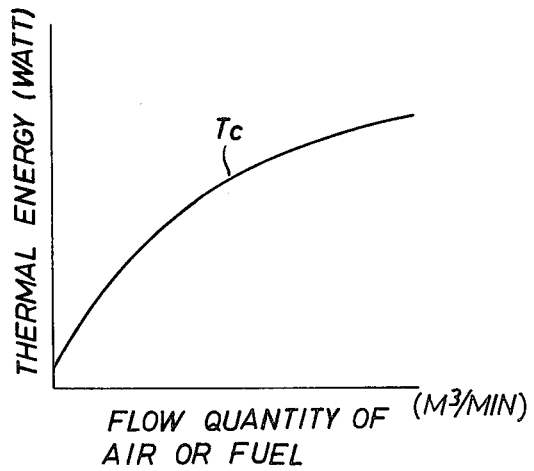
FIG. 4 is a graph showing the relation between thermal energy of the honeycomb heater and quantity of the liquid fuel flowing through the heater.

The honeycomb heater 10 is made of a ceramic composite material of barium titanate with a slight amount of rare earth elements to have a positive temperature coefficient of resistance. In FIG. 3, there is illustrated the relation between the resistance value of the honeycomb heater 10 and the temperature of liquid fuel flowing through the honeycomb heater 10. It should be observed in FIG. 3 that until the temperature of liquid fuel reaches a critical temperature or Curie Point Tc, for instance about 200° C., the resistance value of the heater 10 is maintained in a low value and then rapidly increased after the temperature of liquid fuel rises up to the Curie Point Tc. In FIG. 4, there is illustrated the relation between the thermal energy of the heater 10 and the quantity of liquid fuel flowing through the heater 10. It should be observed in FIG. 4 that the thermal energy of the heater 10 increases in accordance with the increase of the fuel flow quantity. Thus, the heating device 9A functions to heat the liquid fuel flowing through the main fuel passage 20a in response to the variation of the flow quantity of the liquid fuel to vaporize the liquid fuel. Further, the heating devices 9B and 9C have the same characteristics as the heating device 9A and function to heat the air flowing into the passages 17 and 18 in accordance with the variation of the flow quantity of the air.

In practical use of the carburetor, when the ignition switch 14 is closed to start the engine with the throttle valve 7 closed, the heating devices 9A, 9B and 9C are energized and fuel is drawn through the idle port 6a by engine suction. During the idle operation of the engine, liquid fuel supplied from the fuel chamber 19 through the main jet 4 is heated by the heating device 9A, while fresh air in the cleaner is primarily induced into the air passages 17 and 18 and then heated by the heating devices 9B and 9C. Thus, the heated fuel is smoothly vaporized and mixed with the heated air in the slow fuel passage 20b so that the vaporized fuel and air mixture is supplied into the downstream of the throttle valve 7 through the idle port 6a.

During the transition from idle to normal operation of the engine, the throttle valve 7 is opened from the closed position. Upon opening the throttle valve 7, the idle port 6a ceases to function, and the vaporized fuel and air mixture is drawn through the slow port 6 and the main nozzle 3 by the rush of air through the venturi 8a. In this instance, the fresh air from the air cleaner flows mainly into the induction passage 8 through the venturi 8a and partly into the air passages 17 and 18. Fresh air flowing through the passages 17 and 18 is heated by the respective heating devices 9B and 9C and mixed with the vaporized fuel in the fuel passages 20a and 20b. Thus, the vaporized fuel and air mixture is supplied into the induction passage 8 through the slow port 6 and the main nozzle 3 to assure a smooth transition from idle to normal fuel operation.

In this invention, when the air sucked into the air passages 17 and 18 and the liquid fuel from the fuel chamber 19 are at temperatures lower than the critical temperature Tc, each resistance value of the honeycomb heaters 10 in the heating devices 9A, 9B and 9C is maintained in a low value, as shown in FIG. 3, such that the respective honeycomb heaters 10 generate sufficient thermal energy in accordance with the respective flow quantities of the air and the liquid fuel.

If each temperature of the air sucked into the passages 17 and 18 and the liquid fuel from the fuel chamber 19 becomes higher than the critical temperature Tc, each resistance value of the honeycomb heaters 10 is rapidly increased, as shown by a steep line segment in FIG. 3. In this instance, each thermal energy of the honeycomb heaters 10 is restrained so that the sucked air and the liquid fuel may not be heated up over the critical temperature Tc. In other words, the thermal energy of the honeycomb heaters 10 is thermostatically controlled at the critical temperature Tc to heat the sucked air and the liquid fuel approximately up to the critical temperature Tc.

Although the heating devices 9A, 9B and 9C are respectively disposed within the main fuel passage 20a and the main and slow air passages 17 and 18 in the above embodiment, either the heating device 9A or the heating devices 9B and 9C may be eliminated.

Figure 5:
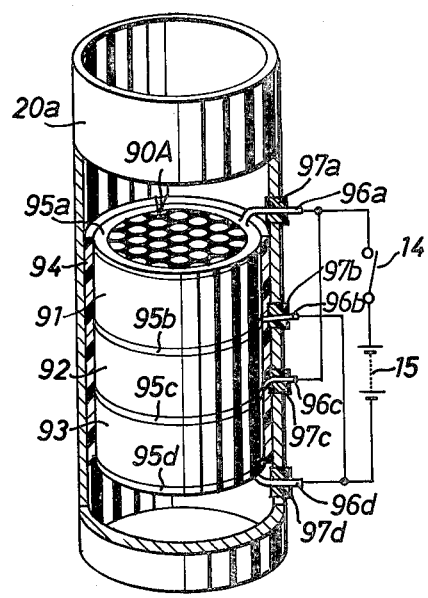
FIG. 5 illustrates a modification of the heating device including three honeycomb heaters.

In FIG. 5, there is illustrated a modification of the heating device 9A which comprises three honeycomb heaters 91, 92 and 93 disposed coaxially within a portion of the main fuel passage 20a through a cylindrical insulator 94. In this modified heating device 90A, the heaters 91, 92 and 93 are arranged in the direction of the liquid fuel flow in sequence and have the same construction as that of the honeycomb heater 10 previously described. Each of the honeycomb heaters 91, 92 and 93 is provided at both ends thereof with annular aluminium layers which are deposited to provide an ohmic contact for electric connection with each of annular electrodes 95a to 95d. The electrodes 95a to 95d are respectively connected to lead wires 96a to 96d extending outwardly through insulators 97a to 97d on the wall of the main fuel passage 20a. The lead wires 96a and 96d are respectively connected to the lead wires 96c and 96b and further connected to the electric power source 15 in series with the ignition switch 14. Thus, the three honeycomb heaters 91, 92 and 93 are electrically connected in parallel to each other.

In the modified heating device 90A, the three honeycomb heaters 91, 92 and 93 are different in their ceramic composition to have different positive temperature coefficients of resistance respectively. As clearly shown in FIG. 6, critical temperatures $Tc_1$, $Tc_2$ and $Tc_3$ of the respective heaters 91, 92 and 93 are difined to be lower in sequence.

In adaptation of the modified heating device 90A to the main fuel passage 20a of the carburetor of FIG. 1, when a temperature of the liquid fuel is lower than the critical temperature $Tc_3$, the liquid fuel is firstly heated by the first honeycomb heater 91 and subsequently heated by the second and third honeycomb heaters 92 and 93. If the temperature of the liquid fuel becomes higher than the critical temperature $Tc_1$, each thermal energy of the honeycomb heaters 91, 92 and 93 is restrained so that the liquid fuel may not be heated up over the critical temperature $Tc_1$.

During heating the liquid fuel, it will be observed that the thermal energy of the first heater 91 is restrained even though the liquid fuel cannot be heated up to the critical temperature $Tc_1$, since the temperature of the heater 91 is increased over the critical temperature $Tc_1$ due to contact of the heated fuel with the inner wall of the heater 91. This means that the liquid fuel may not be sufficiently heated by the first heater 91 and the vaporization of the liquid fuel is still incomplete. In this modified heating device 90A, however, the liquid fuel is further heated by the second and third honeycomb heaters 92 and 93 to complete the vaporization of the liquid fuel. Thus, the liquid fuel is always heated approximately up to the critical temperature $Tc_1$ and vaporized perfectly in the main fuel passage 20a.

Figure 6:
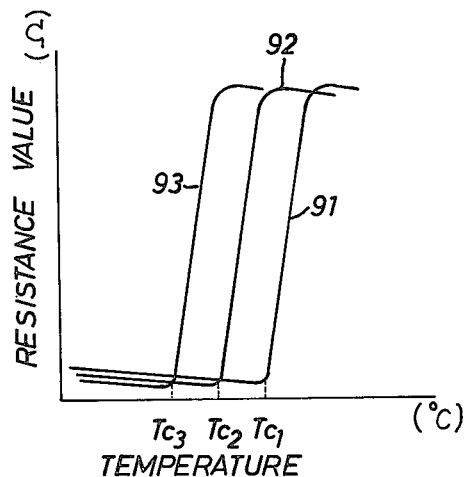
FIG. 6 is a graph showing the relation between respective resistance values of the three honeycomb heaters and temperature of liquid fuel flowing through the heating device.

Although the three honeycomb heaters 91, 92 and 93 have different heating characteristics shown in FIG. 6, the arrangement of the heaters may be reversed or made at random. Furthermore, the number of the honeycomb heater may not necessarily be restricted three pieces.

Figure 7:
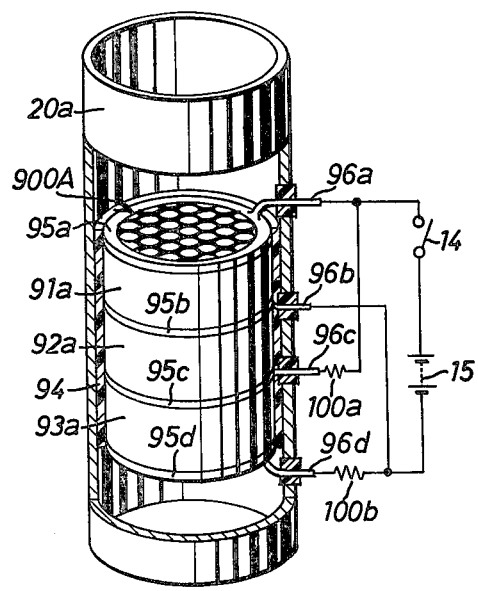
FIG. 7 illustrates another modification of the heating device.

A heating device 900A shown in FIG. 7 has the same heating function as that of the heating device 90A mentioned above. In this modified heating device 900A, three honeycomb heaters 91a, 92a and 93a are the same in their ceramic composition to have an identical positive temperature coefficient of resistance. The first honeycomb heater 91a is connected at the upper electrode 95a thereof to the electrode 95c of the second heater 92a by way of a resistor 100a and further connected at the electrode 95b thereof to the lowermost electrode 95d of the third honeycomb heater 93a by way of a resistor 100b. Resistance values of the resistors 100a and 100b are respectively selected in such a manner that the heating device 900A has the same function as that of the heating device 90A.

In application of the heating device 90A or 900A to the carburetor, it should not be recognized that the heating device 90A or 900A may be substituted for the heating devices 9B and 9C shown in FIG. 1 to heat the air flowing through the respective air passages 17 and 18 and that the resistors 100a and 100b may be eliminated from the heating device 900A of FIG. 7.

Figure 8:
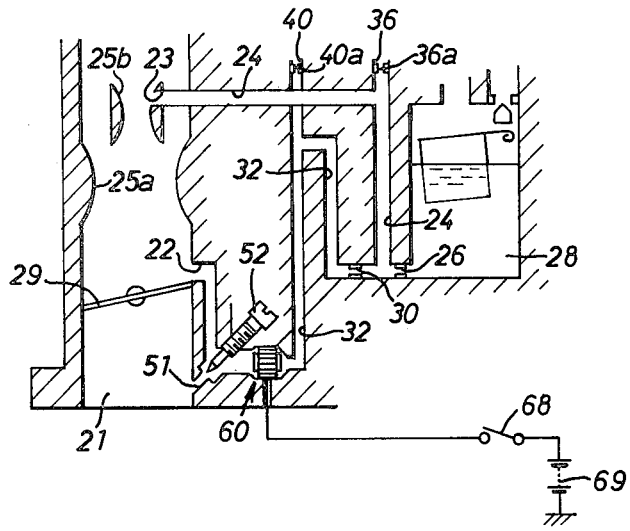
FIG. 8 illustrates another preferred embodiment of the present invention adapted to another type of a conventional carburetor.

FIG. 8 illustrates another preferred embodiment in accordance with the present invention adapted to a conventional carburetor of the other type. The carburetor comprises a barrel or induction passage 21 which communicates at its upstream with an air cleaner (not shown) and at its downstream with an intake manifold of the internal combustion engine for the automobile. The induction passage 21 includes therein a venturi 25a cooperating with a venturi cluster 25b and a throttle or butterfly valve 29 located at the downstream of the venturi 25a.

A main fuel nozzle 23 is open into the throat of the venturi cluster 25 b and is in communication with a main fuel passage 24 extending through a main jet 26 to a fuel chamber 28 supplied with liquid fuel from a fuel tank (not shown). The fuel passage 24 is in communication with a main air passage 36 opening into the upstream of the venturi cluster 25b through a main air bleed 36a. A slow fuel port 22 is open into the induction passage 21 slightly upstream of the closed position of the throttle valve 29 and is in communication with a slow fuel passage 32 extending through a heating device 60 and a slow jet 30 to the main fuel passage 24 between the main jet 26 and the downstream end of the main air passage 36. The slow fuel passage 32 is also in communication with a slow air passage 40 opening into the upstream of the venturi cluster 25b through a slow air bleed 40a. An idle port 51 is open into the induction passage 21 and is in communication with the slow fuel passage 32. At the juncture between the idle port 51 and the slow fuel passage 32, an idle metering screw 52 is threadedly provided to regulate flow quantity of fuel discharged through the idle port 51 from the slow passage 32 into the induction passage 21.

Figure 9:
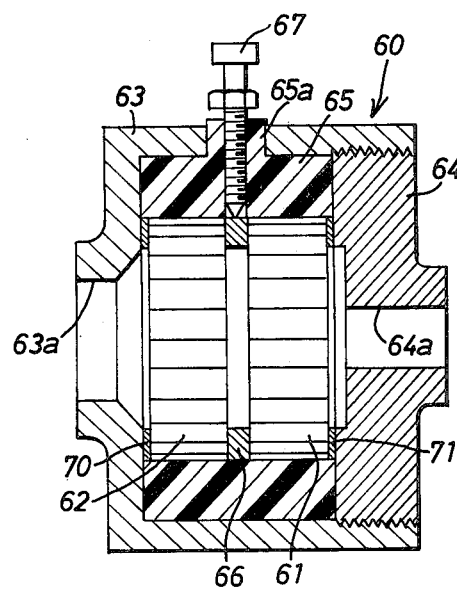
FIG. 9 is an enlarged elevational view in vertical cross-section of a heating device disposed within a slow fuel passage of FIG. 8.
Figure 10:
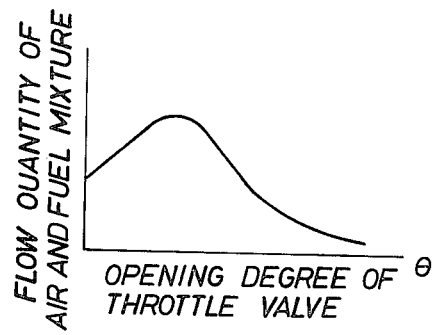
FIG. 10 is a graph illustrating the relation between opening degree of a throttle valve and quantity of air and fuel mixture supplied into an induction passage through a slow or idle port.

The heating device 60 is located adjacent the metering screw 52 at the downstream of the slow air bleed 40a, as shown in FIG. 9, comprising a cylindrical casing 63 disposed within a portion of the slow fuel passage 32. The casing 63 is made of a conductive material and provided at its side wall with an outlet port 63a in connection to the slow and idle ports 22 and 51. A disk cap 64 is threadedly coupled with an open end of the casing 63. The cap 64 is also made of a conductive material and provided thereon with an inlet port 64a in connection to the downstream of the slow air passage 40.

The heating device 60 further comprises a pair of honeycomb heaters 61 and 62 coaxially disposed within the casing 63 by way of a cylindrical insulator 65 to permit the flow of fuel and air mixture from the inlet port 64a to the outlet port 63a therethrough. The heaters 61 and 62 have the same construction as that of the heaters 10 of the previous embodiment. An interim annular electroc 66 is interposed between the heaters 61 and 62 and electrically connected with the tip of a terminal bolt 67 threaded into a projection 65a of the insulator 65. The projection 65a protrudes outwardly through the peripheral wall of the casing 63 to insulate the bolt 67 from the casing 63. As shown in FIG. 8, the terminal bolt 67 is connected through an ignition switch 68 to the plus terminal of an electric power source 69 in the form of a battery. A left annular electrode 70 is interposed between the side wall of the casing 63 and the heater 62, while a right annular electrode 71 is interposed between the cap 64 and the heater 61. Thus, the heaters 61 and 62 are electrically connected in parallel to each other and grounded through the electrodes 70 and 71, the casing 63 and the cap 64. Each of the heaters 61 and 62 is also made of the same material as the heater 10 of the previous embodiment and has the same heating characteristics as that of the heater 10.

In practical use of the carburetor, when the ignition switch 68 is closed to start the engine with the throttle valve 29 closed, the heating device 60 is energized and fuel is drawn through the idle port 51 by engine suction. During the idle operation of the engine, liquid fuel supplied from the fuel chamber 28 through the main and slow jets 26 and 30 is heated by the heating device 60. Simultaneously fresh air in the air cleaner is induced into the slow air passage 40 and then heated by the heating device 60. Thus, the heated fuel is smoothly vaporized and mixed with the heated air in the slow fuel passage 32 so that the vaporized fuel and air mixture is supplied into the downstream of the throttle valve 29 through the idle port 51.

During the transition from idle to normal operation of the engine, the throttle valve 29 is opened from the closed position. Upon opening the throttle valve 29, the idle port 51 ceases to function, and the vaporized fuel and air mixture is drawn through the slow port 22 and the main nozzle 23 by the rush of air through the venturi cluster 25b. In this instance, the flow quantity of fuel and air mixture from the idle and slow ports 51 and 22 is decreased in accordance with the increase of opening degree $\theta$ of the throttle valve 29, while the fuel and air mixture from the main nozzle 23 is increased to maintain the mixing rate of fuel and air sucked into the engine in a predetermined value.

When the fuel and the air across the heating device 60 are at a temperature lower than the critical temperature Tc, each resistance value of the honeycomb heaters 61 and 62 is maintained in a low value such that the respective heaters 61 and 62 generate sufficient thermal energy in accordance with the flow quantity of the liquid fuel and the air.

Figure 11:
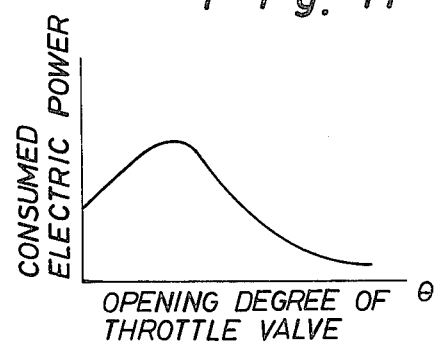
FIG. 11 is a graph illustrating the relation between opening degree of the throttle valve and electric power dissipated in the heating device.

If the temperature of the fuel and air across the heating device 60 becomes higher than the critical temperature Tc, each resistance value of the honeycomb heaters 61 and 62 is rapidly increased so that each thermal energy of the heaters 61 and 62 is restrained. As a result, the fuel and air may not be heated up over the critical temperature Tc and thermostatically controlled at the critical temperature Tc. In this instance, the electric power consumption of the heaters 61 and 62 is controlled in accordance with the flow quantity of the fuel and air across the slow fuel passage 32. This means that the electric power consumption of the heating device 60 changes in accordance with the opening degree $\theta$ of the throttle valve 29, as shown in FIG. 11.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In combination with a carburetor having an induction passage with a venturi and a throttle valve therein, fuel passage means for supplying liquid fuel from a fuel chamber into said induction passage, and air passage means for inducing the air from an upstream portion of the venturi into the fuel passage means: a heating device comprising a plurality of honeycomb heater elements coaxially disposed within one of said fuel and air passage means through a cylindrical insulator to heat the fluid passing therethrough, each of said honeycomb heater elements being made of a ceramic composition having a positive temperature coefficient of resistance and being provided at the opposite ends thereof with a pair of electrodes which are connected in parallel with each other and also connected with an electric power source, whereby the liquid fuel or air is heated by said heating device when the temperature of liquid or air is lower than a critical temperature defined by the ceramic composition of said respective honeycomb heater elements.

2. A carburetor as claimed in claim 1, wherein said honeycomb heater elements are different in their ceramic composition so as to have different positive temperature coefficients of resistance respectively, the respective critical temperature of said heater elements being defined to be lower in sequence from one to another.

3. A carburetor as claimed in claim 1, wherein the electrodes of one of said heater elements are respectively connected through a resistor to the other electrodes of remaining heater elements in such a manner that the respective critical temperature of said heater elements are defined to be lower in sequence from one to another.

4. A carburetor as claimed in claim 1, wherein said fuel passage means comprises a first fuel passage connecting the fuel chamber to a nozzle located at the venturi and a second fuel passage bypassed from a portion of said first fuel passage and connected to a slow fuel port located slightly upstream of the closed position of the throttle valve and an idle port located at the downstream of said throttle valve, and wherein said heating device is disposed within said first fuel passage between the fuel chamber and the bypassed portion of said second fuel passage.

5. A carburetor as claimed in claim 1, wherein said fuel passage means comprises a first fuel passage connecting the fuel chamber to a nozzle located at the venturi and a second fuel passage bypassed from a portion of said first fuel passage and connected to a slow fuel port located slightly upstream of the closed position of said throttle valve and an idle port located at the downstream of said throttle valve, and wherein said heating device is disposed within said second fuel passage adjacent said idle port.

6. A carburetor as claimed in claim 1, wherein said air passage means comprises first and second air passages for inducing the air from upstream of said venturi into said fuel passage means, said heating device being disposed within at least one of said first and second air passages.

7. A carburetor as claimed in claim 4, wherein said air passage means comprises first and second air passages for inducing the air from the upstream of the venturi into said first and second fuel passages respectively, said heating device being disposed within one of said first and second air passages.

8. A heating device adapted for use in a carburetor, comprising:
   a conductive casing disposed within a fluid passage of said carburetor and provided at its opposite end walls with inlet and outlet ports;
   a pair of honeycomb heater elements coaxially housed within said casing through a cylindrical insulator, each of said honeycomb heater elements being made of a ceramic composition having a positive temperature coefficient of resistance and including a cylindrical portion coupled within said insulator and a honeycomb portion to allow the flow of fluid from said inlet port to said outlet port;
   a pair of annular electrodes interposed between each of said honeycomb elements and each inner end-wall of said casing and arranged to be grounded through said casing; and, an interim electrode interposed between said heater elements and connected to a terminal insulated from said casing by means of said insulator, said terminal being connected to an electric power source.

9. A heating device as claimed in claim 8, wherein said insulator is provided at its outer periphery with a projection extended downwardly through said peripheral wall of said casing, said terminal being threaded into said projection of said insulator and connected to said interim electrode.

* * * * *

UNITED STATES PATENT AND TRADEMARK OFFICE
CERTIFICATE OF CORRECTION

PATENT NO. : 4,177,778
DATED : Dec. 11, 1979
INVENTOR(S) : TAKASHI NAITOU ET AL

It is certified that error appears in the above-identified patent and that said Letters Patent are hereby corrected as shown below:

Please change the spelling of the second assignee's name as follows:

[73] --Toyota Jidosha Kogyo Kabushiki Kaisha--

Signed and Sealed this

Sixth Day of May 1980

[SEAL]

Attest:

SIDNEY A. DIAMOND

Attesting Officer

Commissioner of Patents and Trademarks